A. BABENDREER.
PROCESS FOR THE CONSERVATION AND PRESERVATION OF OYSTER LIQUOR.
APPLICATION FILED MAY 24, 1919.

1,371,541.

Patented Mar. 15, 1921.

Witness
G. E. Arundel

Inventor
Albert Babendreer

Attorney

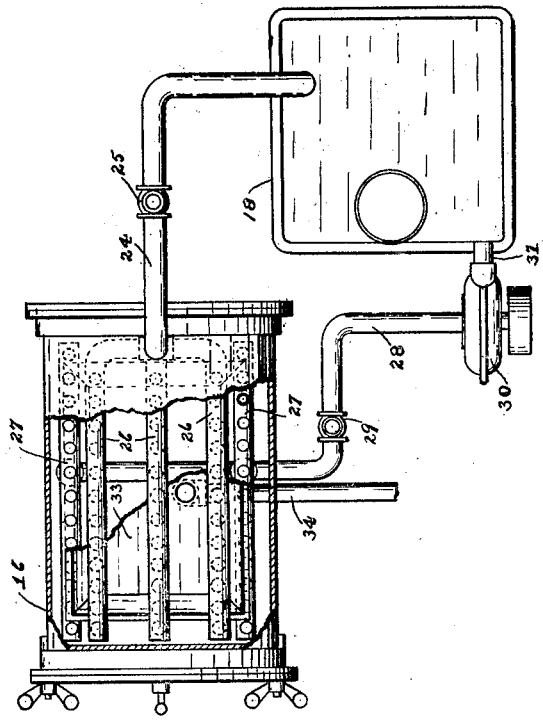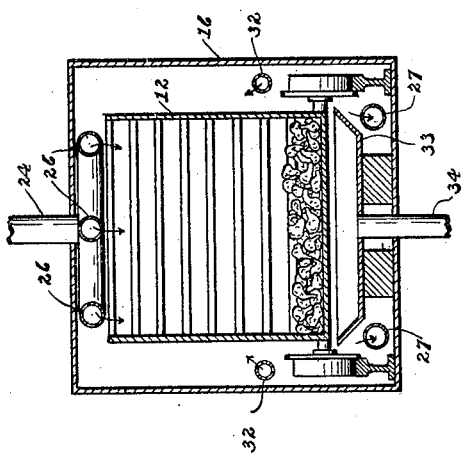

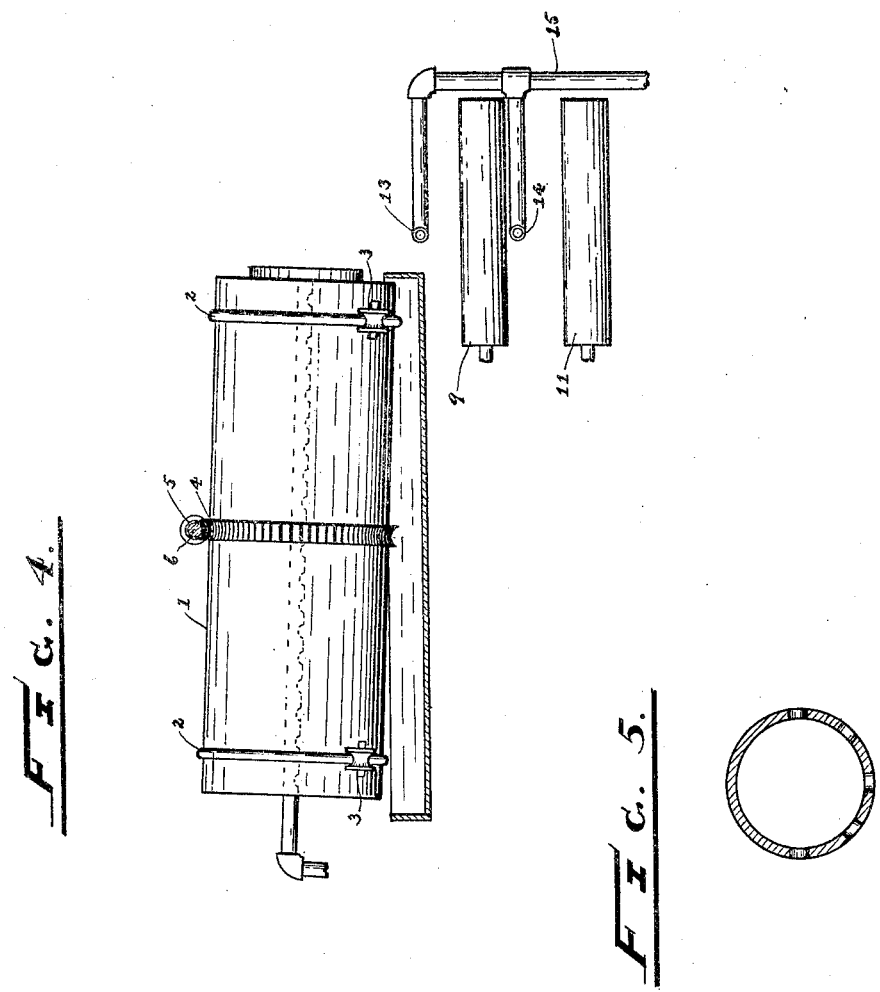

UNITED STATES PATENT OFFICE.

ALBERT BABENDREER, OF BILOXI, MISSISSIPPI.

PROCESS FOR THE CONSERVATION AND PRESERVATION OF OYSTER LIQUOR.

1,371,541.     Specification of Letters Patent.     Patented Mar. 15, 1921.

Application filed May 24, 1919. Serial No. 299,501.

*To all whom it may concern:*

Be it known that I, ALBERT BABENDREER, a citizen of the United States of America, residing at Biloxi, in the county of Harrison and State of Mississippi, have invented certain new and useful Improvements in Processes for the Conservation and Preservation of Oyster Liquor, of which the following is a specification.

This invention has for its object to devise a process whereby the juice or fluid derived or extracted from the oyster, commonly called oyster liquor which contains considerable nutritive value and has a delicate and palatable flavor, may be conserved and converted into a valuable food and seasoning product.

My invention has its greatest usefulness in connection with the production of canned oysters. The process of canning oysters, as at present practised, is substantially as follows: The shells containing the oysters to be treated are introduced, without being washed or cleaned of silt and mud, into retorts and are there exposed to live steam under a pressure of approximately ten pounds until the oysters are cooked, during which cooking process the oyster shells open and the oysters, as they cook, give off a large percentage of their fluid contents. All fluids contained in the original shell or given off by the oysters during the cooking process pass off from the retort with the water of condensation from the steam and, being highly diluted by such water and also rendered unedible and non-palatable by the presence of mud, silt and dirt, become a waste product. This mud flavor cannot be eliminated from the oyster liquor after it has been once contaminated with it.

According to my process for conserving this fluid contents of the oyster, or oyster liquor, it is first essential that the oysters in the shells shall be subjected to a washing process for thoroughly cleansing of the exterior of the shell, thereby removing all silt, mud and foreign matter which might injuriously affect the purity or flavor of the oyster liquor. The shells having been thus cleansed, are then introduced into a retort and there subjected to a predetermined temperature suitable for the cooking of the oysters, which cooking process is conducted in the presence of no more water vapor or moisture than is necessary to prevent the desiccation of the flesh of the oyster. The total volume of liquid produced by condensation in the retort is so small as not to injuriously dilute the oyster liquor. The retort may be heated either by hot air, directly admitted, or by the application of external heat to the retort, or by the circulation through conduits in the retort of a heating medium which will produce the desired temperature conditions therein by radiation and the moisture vapor may be either introduced into the retort or the air circulating therethrough by a steam jet or spray, or it may be generated as a vapor in the retort by the action of the heat on the liquid therein.

The treatment of the oysters in the retort results in the opening of the shells and the giving off of the liquor contained in the shell as well as that extracted from the oysters during the cooking process and this fluid or liquor is caught in any suitable container and withdrawn from the retort for subsequent treatment. Preferably the vessel is disposed only under the oyster car and is adapted to catch as little as possible of the water of condensation in the retort which collects principally upon the walls of the retort.

The oyster liquor as drawn off from the retort is preferably passed through a suitable settling tank in which most of the foreign matter therein will have opportunity to settle. The purified liquor as drawn off from the settling tank may be further treated in a centrifugal separator and a pure clean liquor extracted.

As a final step the purified liquor is introduced into suitable containers which are hermetically sealed and subjected to the proper temperature in any well known manner for the sterilization of the contained liquor. The liquor as thus produced possesses a high nutritive value and a delicious flavor and is available as a soup stock or a flavoring.

As illustrative of an apparatus for carrying out my process as hereinbefore described, reference is made to the accompanying drawings, in which:—

Figures 1 and 2 illustrate respectively side and end elevations of the washing apparatus for the oyster shells.

Fig. 3 is a side elevation partly broken away of the retort and furnace for heating the air utilized to cook the oyster in the retort.

Fig. 4 is a plan view of Fig. 3.

Fig. 5 is a cross sectional view of the retort showing the liquor collecting vessel in the retort connected to purifying devices which successively act on the liquor.

Similar reference numerals refer to similar parts throughout the drawings.

Figure 1:
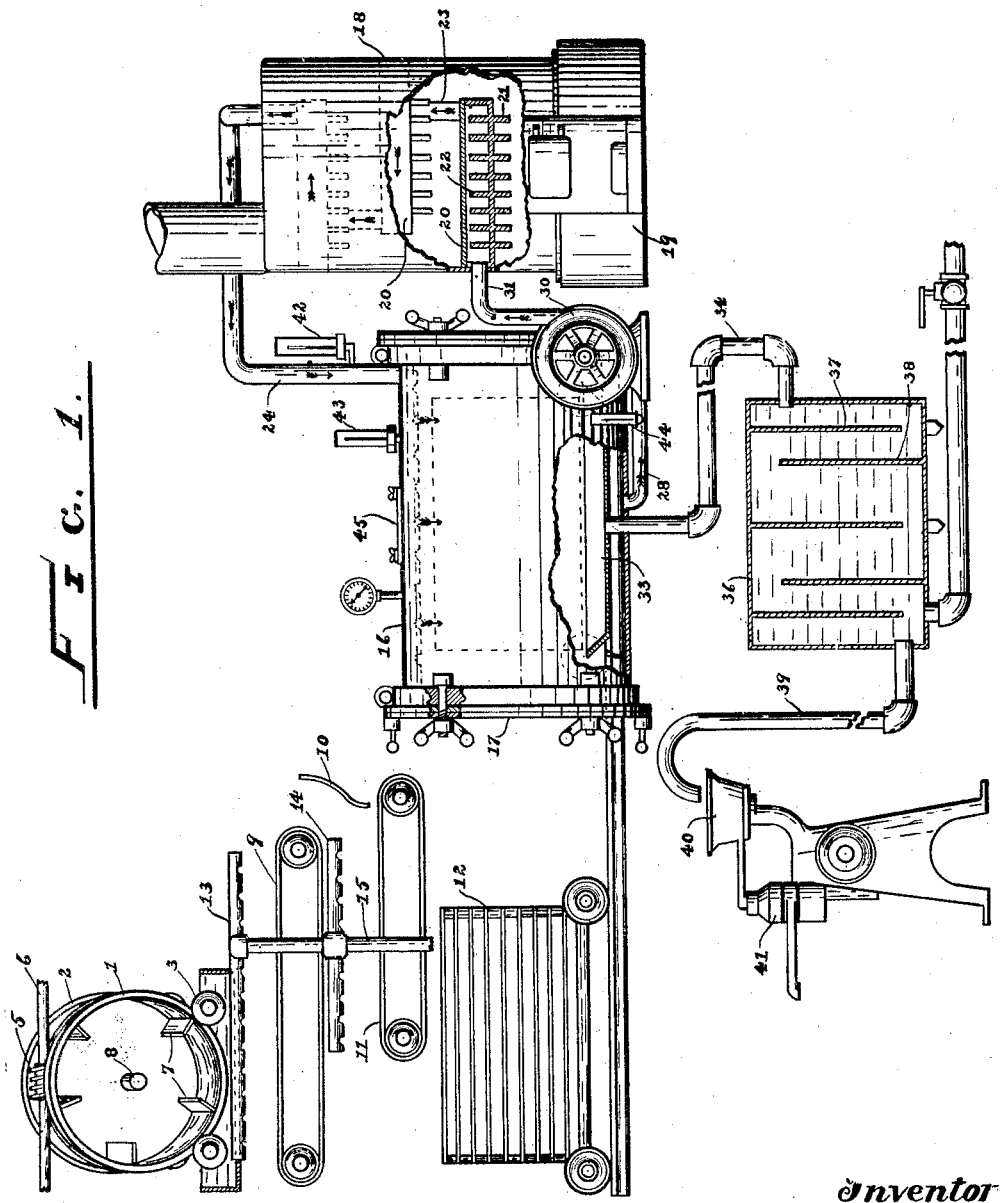

The apparatus as illustrated comprises a washer for the oysters in the shell, which consists of a tubular washer 1, similar to the well known type of log washers employed for the washing of ores and the like. This washer is provided with annular tracks 2 which turn on grooved roller supports 3. The washer is driven by an annular worm wheel 4 meshing with a worm gear 5 on the driving gear 6. The washer has longitudinal radially disposed baffles 7 mounted therein and extend from end to end thereof and a water pipe 8 passes axially through the washer and has spray orifices for its full length in the washer disposed to spray jets of water upon the oysters as they slowly traverse the rotating washer in the direction of its downward inclination. The oysters are discharged from the washer onto a belt conveyer 9 on which they travel to a chute 10 which is adapted to invert the oysters and deposit them on a lower belt conveyer 11 which discharges them into cars or containers 12 in which they pass to the cooking retorts. Spray pipes 13 and 14 are supplied with water under pressure by a pipe 15 and disposed to direct strong sprays of water downwardly on the oyster shells as they travel along the belt conveyers 9 and 11. The washing and rinsing of the shells containing the oysters, as thus performed, will remove from the shells all external foreign matter which might pollute or injure the liquor.

The cars or containers 12 are moved into a retort 16 which is preferably a metallic vessel having removable end closures 17 adapted to fit pressure tight in its open ends. The preferred means for heating the retort comprises a furnace 18 having a grate 19 above which are a series of hollow horizontal baffle walls 20 preferably formed by castings having radiating fins 21 exposed to the products of combustion in the furnace and fins 22 which project into the hot air chamber in the baffle. The baffles have a staggered arrangement one above the other in the heating furnace and their hot air chambers are connected by pipes 23 in series with each other. The upper baffle is connected by a pipe 24 which, under control of valve 25, delivers the air heated in its passage through the furnace baffles to perforated distributing pipes 26 in the retort which extend from end to end centrally along the top thereof. The hot air is withdrawn from the bottom of the retort through perforated eduction pipes 27 also preferably extending lengthwise of the retort. Each of these eduction pipes is connected to a hot air return pipe 28 which contains a regulating valve 29 and delivers the air to a centrifugal blower 30 which returns it through a pipe 31 into the lower baffle 20, thus completing a closed circuit downwardly through the retort and upwardly through the heating baffles in the furnace.

The retort is provided with spray pipes 32, one of which is preferably arranged lengthwise along each side and through these steam or water vapor from any suitable source and in the desired amount is introduced in the retort. In the lower part of the retort, below the car or container 12 for the oysters, I arrange a receptacle 33 for catching and collecting the juices or liquor given off from the oysters during their treatment in the retort and this liquor is drawn off from the receptacle through a pipe 34 under control of a valve 35 and discharged into a settling tank 36 having staggered vertically disposed baffles 37 and 38 therein which cause it to deposit most of its sediment and foreign matter in this tank before passing off through the eduction pipe 39 into the bowl 40, whence it flows into the centrifugal separator 41 for final purification.

The down draft of hot air through the retort will act to rapidly cook the oysters and the desiccation of the flesh of the oysters will be prevented not only by the moisture generated by heat in the closed circulation of hot air but also by such additional water vapor as may be supplied through the pipes 32. The temperature in the retort is controlled by the volumetric flow of the hot air as well as by the regulation of the heat of the furnace and thermometers 42, 43 and 44 are arranged at suitable points on the hot air inlet and outlet pipes and on the retort for the regulation of the temperatures. A removable plate 45 is provided in the top of the retort so that the processing of the oysters may be observed from time to time by removing this plate.

My invention being confined to the process itself no claim is herein made to the apparatus which is described merely for the purpose of exemplifying a practicable means for carrying my process into effect.

Having thus described my invention, what I claim as new and desire to secure by Letters Patent, is:—

1. The hereindescribed process for the conservation of oyster liquor, which consists in cleansing the external surface of the shells containing the oysters, subjecting the cleansed shells containing the oysters to a cooking temperature, and catching the liquor derived from the oysters under treatment, substantially as described.

2. The hereindescribed process for the conservation of oyster liquor, which consists in cleansing the external surface of the shells containing the oysters, subjecting the cleansed shells containing the oysters to a cooking temperature, in the presence of water vapor substantially equal in quantity to that needed to prevent desiccation of the flesh of the oysters, and catching the liquor derived from the oysters under treatment, substantially as described.

3. The hereindescribed process for the conservation of oyster liquor, which consists in cleaning the external surface of the shells containing the oysters, subjecting the cleansed shells containing the oysters to a cooking temperature, catching the liquor as it is given off from the oysters under treatment, and treating the liquor to remove therefrom foreign matter.

4. The hereindescribed process for the conservation and preservation of oyster liquor, which consists in cleaning the external surface of the shells containing the oysters, subjecting the cleansed shells containing the oysters to a cooking temperature, catching the liquor as it is given off from the oysters under treatment, treating the liquor to remove therefrom foreign matter, and collecting the purified liquor in vessels which are hermetically sealed and subjected to a sterilizing heat.

5. The hereindescribed process for the conservation and preservation of oyster liquor, which consists in cleansing the external surface of the shells containing the oysters, subjecting the cleansed shells containing the oysters to a cooking temperature in the presence of just enough moisture to prevent desiccation of the flesh of the oyster, and collecting the liquor given off by the oysters during the cooking process.

6. The hereindescribed process for the conservation of oyster liquor, which consists in treating oysters in their shells in a closed retort, and cooking the oysters in the retort by a continuous circulation of the same body of air maintained at a predetermined temperature.

7. The hereindescribed process for the conservation of oyster liquor, which consists in treating oysters in their shells in a closed retort, and cooking the oysters in the retort by a continuous circulation of the same body of air maintained at a predetermined temperature and having sufficient water vapor to prevent the desiccation of the meat of the oysters.

8. The hereindescribed process for the conservation of oyster liquor, which consists in treating oysters in their shells in a closed retort, and cooking the oysters in the retort by a continuous circulation of the same body of air maintained at a predetermined temperature and having its moisture content supplemented by the admission into said closed circulation of sufficient water vapor to prevent the desiccation of the meat of the oysters.

9. The hereindescribed process for the conservation of oyster liquor, which consists in subjecting the shells containing the oysters to a washing operation to remove external foreign matter, introducing the cleansed shells into a retort, subjecting the shells in said retort to a circulation of moist hot air maintained at a cooking temperature, catching and collecting the liquor as given off from the oysters during the cooking process, and purifying the liquor by separating therefrom foreign matter in suspense therein.

In testimony whereof I affix my signature.

ALBERT BABENDREER.

Witness:
A. F. GOODMAN.